(12) United States Patent
Kurematsu et al.

(10) Patent No.: US 8,007,384 B2
(45) Date of Patent: Aug. 30, 2011

(54) HYDRAULIC TENSIONER

(75) Inventors: Yuji Kurematsu, Osaka (JP); Katsuji Shigematsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 254 days.

(21) Appl. No.: 12/354,460

(22) Filed: Jan. 15, 2009

(65) Prior Publication Data

US 2009/0209377 A1    Aug. 20, 2009

(30) Foreign Application Priority Data

Feb. 18, 2008  (JP) ................................. 2008-035573

(51) Int. Cl.
*F16H 7/22* (2006.01)

(52) U.S. Cl. .......................... 474/110; 474/111; 474/115

(58) Field of Classification Search .......... 474/109–111, 474/113–115
See application file for complete search history.

(56) References Cited

U.S. PATENT DOCUMENTS

| | | | |
|---|---|---|---|
| 5,346,436 | A | 9/1994 | Hunter et al. |
| 6,117,033 | A | 9/2000 | Simpson |
| 6,716,124 | B2 * | 4/2004 | Markley .................. 474/110 |
| 7,037,229 | B2 * | 5/2006 | Hayakawa et al. ........... 474/110 |
| 7,691,017 | B2 * | 4/2010 | Seungpyo et al. ........... 474/109 |
| 2002/0065159 | A1 * | 5/2002 | Markley .................. 474/110 |
| 2004/0087399 | A1 * | 5/2004 | Hayakawa et al. ........... 474/110 |
| 2005/0227799 | A1 | 10/2005 | Yoshida |
| 2005/0239589 | A1 | 10/2005 | Seungpyo |
| 2007/0243961 | A1 | 10/2007 | Aimone |
| 2007/0287562 | A1 * | 12/2007 | Assel .................. 474/110 |
| 2009/0209376 | A1 * | 8/2009 | Kurematsu et al. ........... 474/110 |
| 2009/0209377 | A1 * | 8/2009 | Kurematsu et al. ........... 474/110 |
| 2009/0209378 | A1 * | 8/2009 | Kurematsu .................. 474/110 |

FOREIGN PATENT DOCUMENTS

| | | |
|---|---|---|
| DE | 103 27 024 A1 | 1/2004 |
| DE | 10 2007 023 671 A1 | 12/2007 |
| DE | 10 2007 036 119 A1 | 7/2008 |
| DE | 20 2007 002 456 U1 | 8/2008 |
| DE | 20 2007 004 988 U1 | 9/2008 |
| JP | 04-157220 | 5/1992 |
| JP | 4-78360 | 8/1992 |
| JP | 07-158703 | 6/1995 |
| JP | 2000-145903 | 5/2000 |
| JP | 2005-299783 | 10/2005 |

OTHER PUBLICATIONS

Yuji Kurematsu and Takeshi Ogawa, Hydraulic Tensioner, U.S. Appl. No. 12/354,292, filed Jan. 15, 2009.

Yuji Kurematsu, Hydraulic Tensioner, U.S. Appl. No. 12/354,909, filed Jan. 16, 2009.

* cited by examiner

*Primary Examiner* — Sang Kim

(74) *Attorney, Agent, or Firm* — Howson & Howson LLP

(57) ABSTRACT

In a hydraulic tensioner having a coiled plunger-biasing spring, the volume of the high pressure oil chamber is reduced by incorporating a bar inside the spring. One of both ends of the spring are formed to block passage of the bar, so that the bar and spring can be installed as a pre-assembled unit, and dropping of the bar out of the spring can be avoided.

16 Claims, 5 Drawing Sheets

HYDRAULIC TENSIONER

CROSS-REFERENCE TO RELATED APPLICATION

This application claims priority on the basis of Japanese patent application 2008-035573, filed Feb. 18, 2008. The disclosure of Japanese application 2008-035573 is hereby incorporated by reference.

FIELD OF THE INVENTION

The invention relates to a hydraulic tensioner for maintaining proper tension in an endless, flexible, traveling transmission medium such as a timing belt, or a timing chain in a vehicle engine.

BACKGROUND OF THE INVENTION

Hydraulic tensioners incorporating check valves have been widely used to maintain proper tension, and to suppress vibration, in a timing belt or timing chain used to transmit rotation between a crankshaft and one or more camshafts in a vehicle engine.

As shown in FIG. 4, a conventional hydraulic tensioner 500 is typically mounted on an engine adjacent the slack side of a timing chain C, which is driven by a crankshaft sprocket S1 and in driving relationship with camshaft sprockets S2. A hollow plunger 520 protrudes slidably from a housing 510 and applies tension to the slack side of the timing chain C by pressing against the back of a pivoted lever L1 on which the chain slides. A fixed guide L2 is provided on the tension side of the timing chain C. The sprockets and chain move in the directions indicated by arrows in FIG. 12.

As shown in FIG. 5, in the hydraulic tensioner 500, the cylindrical plunger 520 fits slidably in a plunger-accommodating hole 511 formed in the housing 510. A high pressure oil chamber R is formed by the plunger 520 and a plunger-accommodating hole 511. The plunger is urged in the protruding direction by a plunger-biasing coil spring 530.

A check valve unit 540 is press-fit into the bottom portion of the plunger-accommodating hole 511. The check valve unit allows oil to flow from a source (not shown) of oil under pressure into the high pressure oil chamber R, but blocks reverse flow of oil.

The check valve unit 540 comprises a ball 541, a ball guide 542, which envelops the ball 541, a retainer 543, fixed to one end of the guide 542, and a ball seat 544, fixed to the opposite end of the guide 542. The ball can move toward and away from the seat through a distance limited by the retainer. When the ball guide is moved away from the seat, oil can flow through the check valve unit 540 into the high pressure oil chamber R. When the ball is in engagement with the seat, it blocks reverse flow of oil.

In operation of the tensioner, oil in the high pressure oil chamber R leaks through a slight clearance between the outer circumferential surface of the plunger 520 and the inner circumferential surface of the plunger-accommodating hole 511, and is discharged to the outside of the housing 510. Because of the viscosity of the oil, there is a resistance to flow through the clearance between the plunger and the plunger-accommodating hole. The resistance to flow enables the tensioner to exert a damping action, absorbing impact forces exerted on the plunger 520 and reducing vibration of the plunger 520. An example of a hydraulic tensioner having the above-described features is found in United States Patent Application Publication US2005/0227799.

In a conventional hydraulic tensioner, oil is supplied to the high pressure oil chamber by a pump driven by an engine. When the engine is stopped, the supply of oil to the high pressure oil chamber is also stopped. Some of the oil left in the chamber leaks through the clearance between the plunger and the inner circumferential surface of the plunger-accommodating hole and is discharged and replaced by air. When the engine is re-started after having been stopped for a long time, a considerable amount of time is required for replenishment of the oil in the high pressure oil chamber of the tensioner, and the damping action of the tensioner is therefore delayed.

The delay between the time the engine is started and the time at which the damping action of the tensioner commences can be reduced by shortening the high pressure oil chamber or reducing the thickness of the plunger-biasing spring. However, these measures reduced the load capacity and spring constant of the spring, and impair the performance of the tensioner.

This invention reduces the delay in commencement of the damping action by the incorporation of a bar inside the coil spring of a tensioner. The bar reduces the volume of the high pressure oil chamber, and consequently, replenishment of oil in the chamber can take place more rapidly than in a conventional hydraulic tensioner. The incorporation of the bar inside the coil spring makes it possible to reduce the volume of the high pressure oil chamber without shortening the stroke of the plunger, and without reducing the length of the spring, without reducing the thickness of the wire from which the spring is made, without impairing the spring's load capacity, and without affecting its spring constant.

Incorporation of a bar inside a coiled plunger-biasing spring makes assembly of a tensioner more difficult because, when the bar is inside the spring, it cannot be easily gripped, and can drop out of the spring by gravity. This invention addresses the problem of drop-out of the bar.

SUMMARY OF THE INVENTION

The hydraulic tensioner according to the invention comprises a housing having a plunger-accommodating hole extending along an axis, the hole having an opening and a bottom spaced from the opening. A plunger slidably protrudes from the plunger-accommodating hole, through the opening, in a protruding direction, and, with the hole, defines a high pressure oil chamber. The plunger is movable from a fully retracted position to a fully extended position. A coil spring is disposed within the high pressure oil chamber, and wound around the axis of the plunger-accommodating hole. The coil spring is in compression, and biases the plunger in its protruding direction.

A check valve incorporated into the housing allows oil to flow into the high pressure oil chamber and blocks flow of oil out of the high pressure oil chamber. A bar, at least a part of which is located within said coil spring, reduces the volume of the high pressure oil chamber.

The coil spring has first and second opposite ends, and the diameter of a part of the coil spring between its ends is sufficiently large to provide a clearance between the spring and the bar, the clearance allowing relative axial movement of the spring and the bar. A part of the coil spring adjacent at least one of its first and second opposite ends is positioned to block passage of the bar out of the coil spring, whereby the bar is prevented from dropping out of the coil spring during assembly of the tensioner. The part of the coil spring that blocks passage of the bar can be a part of the coil spring that is bent inward.

When the check valve is positioned at the bottom of the plunger-accommodating hole, the end of the coil spring through which passage of the bar is blocked can is located adjacent the bottom of the plunger-accommodating hole. The bar can have a cylindrical intermediate portion and a tapered end portion facing the check valve. The tapered end portion can be sufficiently narrow to be able to extend axially past the end of the coil spring adjacent the bottom of the plunger-accommodating hole, so that it can contact the check valve. The tapered end portion can also be sufficiently narrow to allow flow of oil through the check valve into the high pressure oil chamber when in contact with said check valve.

When the plunger is in its fully retracted position, the axial length of the coil spring can be greater than the axial length of the bar.

Because the bar reduces the volume of the high pressure oil chamber, the time required for replenishment of oil in the high pressure oil chamber is reduced, and the damping action of the tensioner can commence more quickly on engine start-up. Moreover, this result can be achieved using a plunger-biasing spring having a high load capacity, a low spring constant, and a length and thickness, equivalent to those of a plunger-biasing spring in a conventional hydraulic tensioner.

Furthermore, since a part of the coil spring adjacent one or both of its ends is positioned to block passage of the bar out of the coil spring, the bar can be prevented from dropping out of the coil spring during assembly of the tensioner. The bar and the spring can be preassembled and incorporated into the plunger-accommodating hole of the tensioner housing as a unit, thereby avoiding dropping of the bar out of the spring, and simplifying manufacture of the tensioner. Since the bar is incorporated into the spring before installation of the spring into the tensioner housing, the assembly process does not differ materially from the process of assembly of a conventional hydraulic tensioner.

When portions of the plunger-biasing spring are bent inwardly, dropping out of the bar can be prevented by a simple structure. Moreover, extension and contraction of the plunger-biasing spring are not influenced by the bar. Consequently, the tensioner can exhibit damping performance similar to that of a conventional hydraulic tensioner having no bar.

When the bar has a tapered end facing a check valve at the bottom of the plunger-accommodating hole, the end of the bar can come into contact with the check valve without impairing the flow of oil into the high pressure oil chamber. Consequently, the volume of the high pressure oil chamber can be reduced, the delay in replenishment of oil in the chamber on engine start-up can be reduced, and the damping performance of the tensioner can be otherwise similar to that of a conventional hydraulic tensioner having no volume-reducing bar.

Finally, because, the axial length of the coil spring is greater than the axial length of the bar said bar even when the plunger is in its fully retracted position, the plunger stroke can be the same as that of a conventional hydraulic tensioner having no bar, and the same damping performance can be achieved.

DETAILED DESCRIPTION OF THE PREFERRED EMBODIMENTS

Briefly, the hydraulic tensioner according to the invention is similar to a conventional hydraulic tensioner, but characterized by a bar that reduces the volume of the high pressure oil chamber of the tensioner. The reduction in the volume of the high pressure oil chamber shortens the time required for replenishment of oil into the chamber on engine start-up. The bar is accommodated, at least partly, within the tensioner's plunger-biasing coil spring, and consequently a spring having a length and thickness, a load capacity, and a low spring constant, similar to those of a spring in a conventional tensioner, can be used.

The tensioner can utilize any of various types of check valves, and the bar can be composed of any of various materials, including, for example, a metal such as iron, or a resin or the like.

Figure 1:
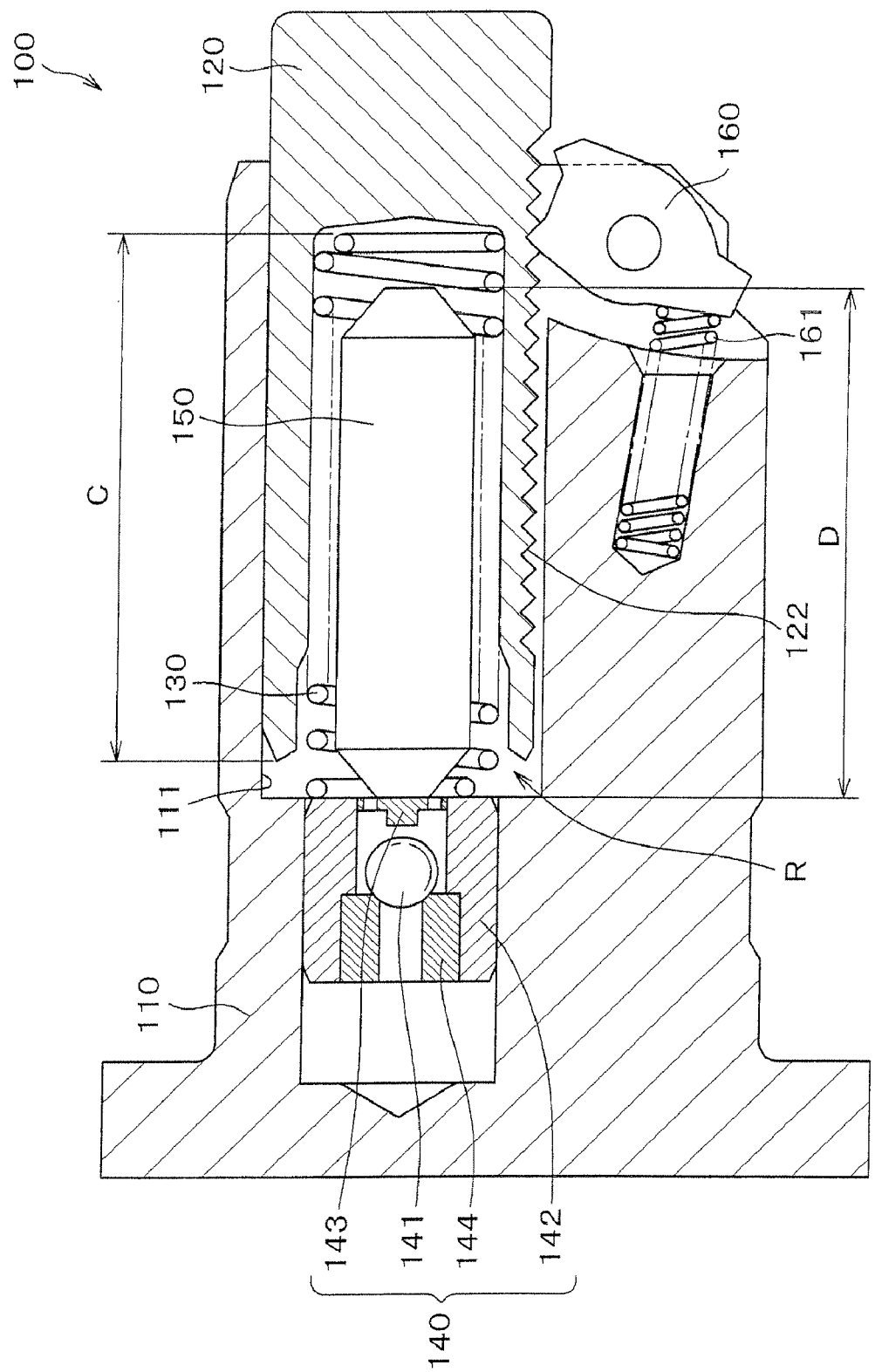
FIG. 1 is a cross-sectional view of a hydraulic tensioner according to the invention.

In the hydraulic tensioner 100, shown in FIG. 1, a hollow, cylindrical, plunger 120, having a longitudinal rack 122 of ratchet teeth, protrudes from, and is slidable in, a plunger-accommodating hole 111 in a housing 110. A plunger-biasing spring 130, in the form of a helical coil spring, urges the plunger 120 in the protruding direction, and is accommodated in a high pressure oil chamber R formed by the plunger 120 and the plunger-accommodating hole 111.

A check valve unit 140 is incorporated into the bottom of the plunger-accommodating hole 111 to allow flow of oil from a source (not shown) of oil under pressure into the high pressure oil chamber R while blocking reverse flow.

The check valve unit 140 comprises a check ball 141, a ball seat 144, a ball guide 142, which envelops the ball while allowing the ball to move freely toward and away from the ball seat, and a retainer 143, fixed to the ball guide 142. The retainer holds check ball in the ball guide 142, while allowing the ball to move toward and away from the seat 144 through a limited distance.

The rack 122 on the plunger 120 is engaged by an ratchet pawl 160, which is pivoted on the housing 110 and biased by a spring 161 into engagement the rack 122 to allow the plunger to move in the protruding direction while limiting retraction of the plunger to an amount corresponding to the backlash of the ratchet mechanism. The ratchet mechanism, is, of course, optional.

The plunger-biasing spring 130 has a high load capacity and a low spring constant, and has the length and thickness necessary in order to perform adequately as a plunger-biasing spring in a hydraulic tensioner. A bar 150 is incorporated into the space inside the plunger-biasing spring 130.

As shown in FIG. 2(a), the outer diameter MF of the bar 150 is slightly smaller than the inner diameter ME of the plunger-biasing spring 130. The bar 150 is preferably a solid bar, having a cylindrical shape throughout most of its length. Both ends of the bar 150 are tapered, being in the form of truncated cones 151. The bar 150 reduces the volume of the high pressure oil chamber R by an amount equivalent to the volume of the bar 150, but does not affect extension and contraction of the plunger-biasing spring 130, and does not affect the flow of oil into the high pressure oil chamber R.

The plunger-biasing spring 130 is formed that at least one of its end portions is bent inwardly. Preferably, both of its end portions are bent inwardly. Although the inward bending of the ends of the spring can be achieved in any of various configurations, preferably, the windings at the ends of the spring have a reduced diameter. Thus, the endmost windings can each have a diameter φA, which is slightly less than the outer diameter φF of the bar 150. Consequently, the bar 150 cannot drop out of the spring.

Figure 3:
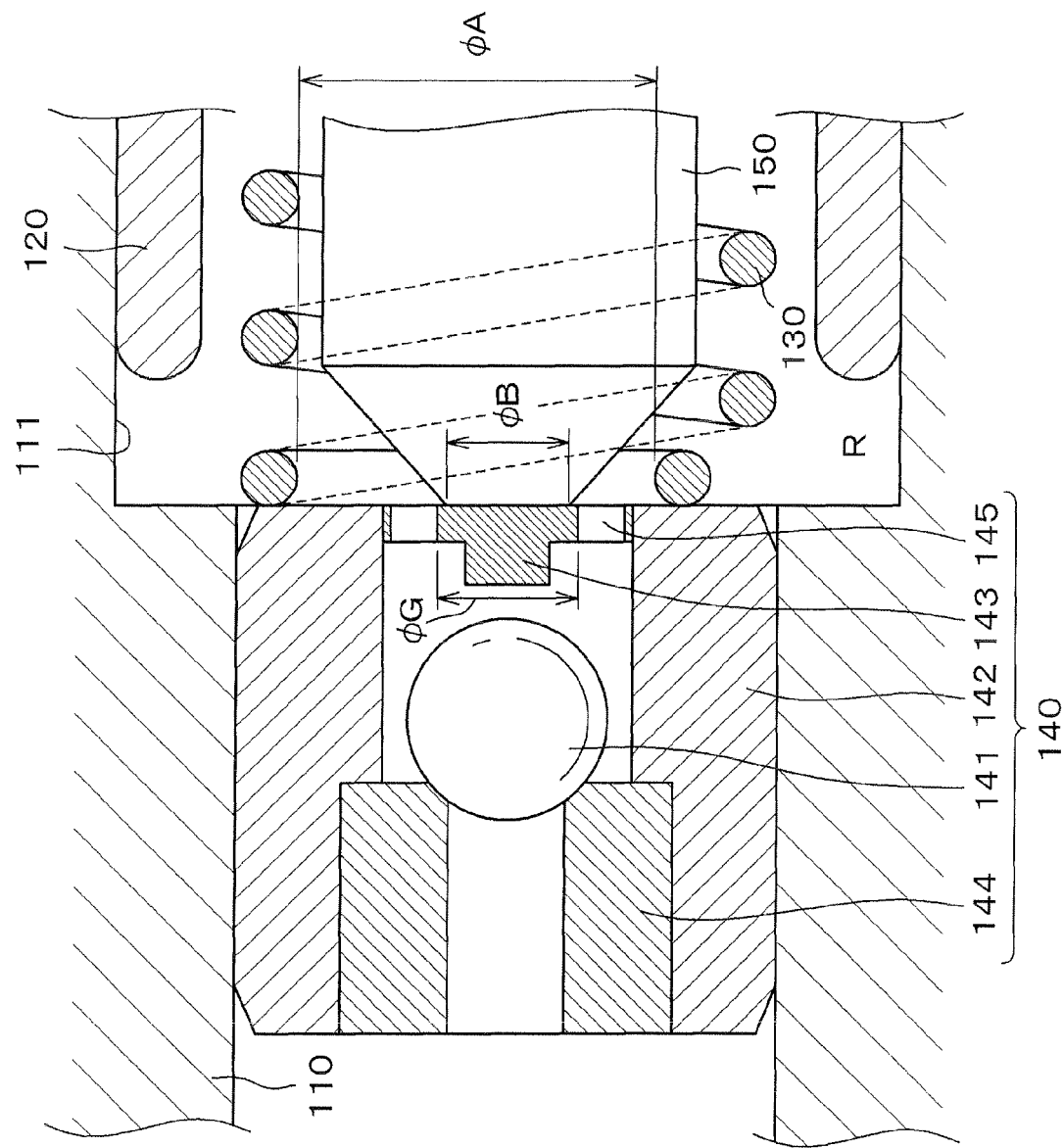
FIG. 3 is an enlarged cross-sectional view of a part of the tensioner of FIG. 1, showing the relationship between the bar and the check valve.
Figure 4:
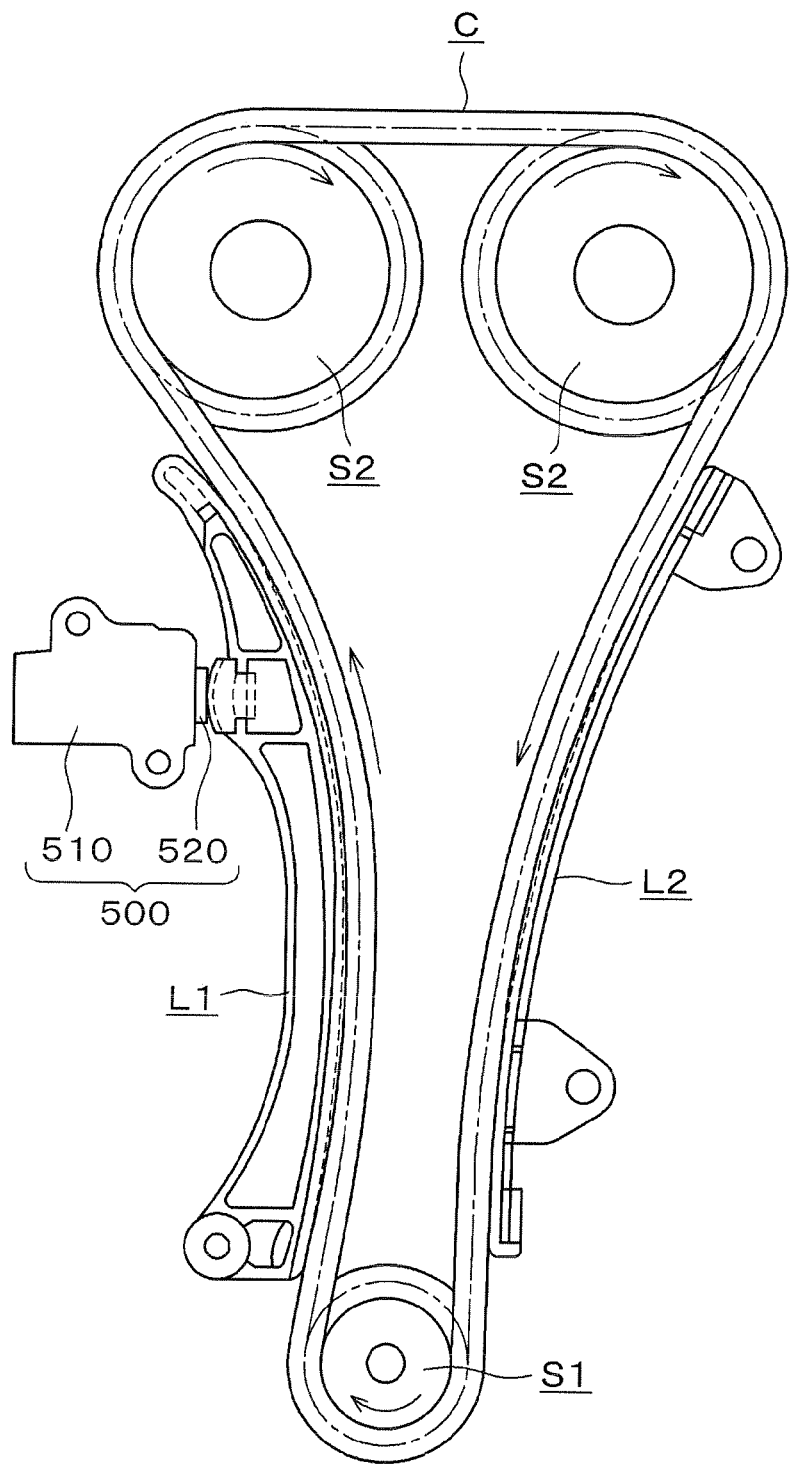
FIG. 4 is a schematic elevational view of the timing drive in a conventional vehicle engine.
Figure 5:
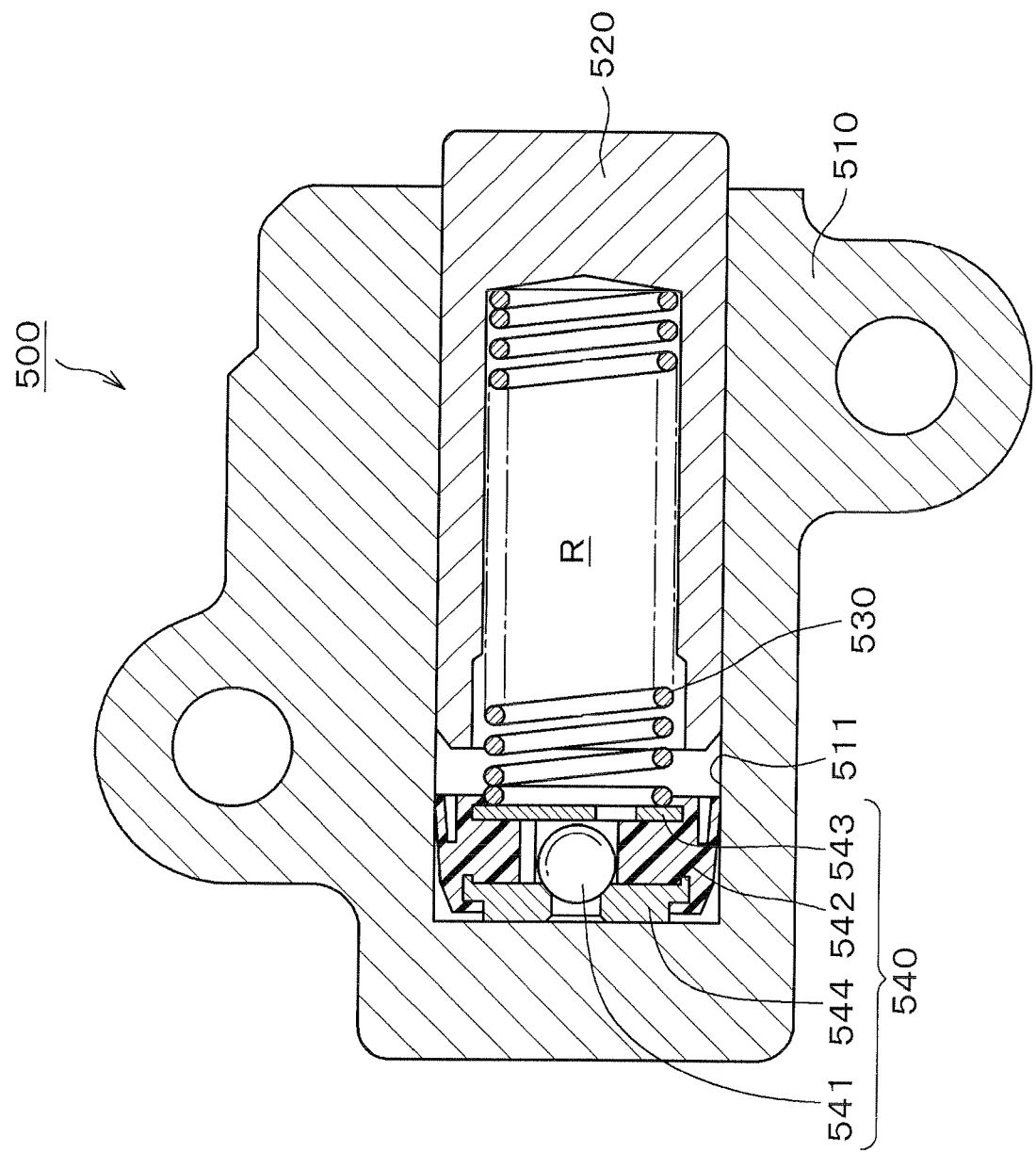
FIG. 5 is a cross-sectional view of a conventional hydraulic tensioner.

As shown in FIG. 3, the retainer 143 of the check valve unit 140 is provided with a plurality of oil passages 145, preferably in a circular array. Oil is supplied to the high pressure oil chamber R through these oil passages. The taper of the ends of the bar is such that the outer diameter φB of the end surface at the end of the bar 150 facing the check valve is smaller than the inner diameter φA of the end of the plunger-biasing spring 130, and also smaller than the diameter φG of a circle inscribed in, and tangent to, the circular array of oil passages 145. Thus, abutment of the bar 150 against the retainer 143 does not prevent inflow of the oil through the retainer into the high pressure oil chamber.

As shown in FIG. 1, the length D of the bar 150 is less than the length C of the plunger-biasing spring 130 measured when the plunger 120 is in its fully retracted condition. Consequently, the plunger stroke can be the same as that of a conventional hydraulic tensioner having no bar.

In summary, in the tensioner of the invention, the volume of the high pressure oil chamber R is reduced by an amount equivalent to the volume of the bar 150. Because the bar is accommodated within the plunger-biasing spring, the time required for replenishment of oil in the high pressure oil chamber R on engine start-up is significantly reduced without the need to shorten the spring, or change its thickness. Thus initiation of the damping action of the tensioner can take place almost immediately following engine start-up, even when the oil supply in the high pressure oil chamber is depleted significantly due to leakage over a long interval during which the engine is not operated. Moreover, the performance of the tensioner can be otherwise the same as that of a conventional hydraulic tensioner of comparable size.

Furthermore, since the inner diameter φA of one or both end portions of the plunger-biasing spring 130 is slightly smaller than the outer diameter φF of the bar 150, the bar 150 can be prevented from dropping out of the spring, and the bar 150 and the spring can be installed in the housing as a pre-assembled unit. Thus, error-free manufacture of the tensioner is facilitated, and assembly can be carried out by the same steps as used in the manufacture of a conventional hydraulic tensioner.

Figure 2:
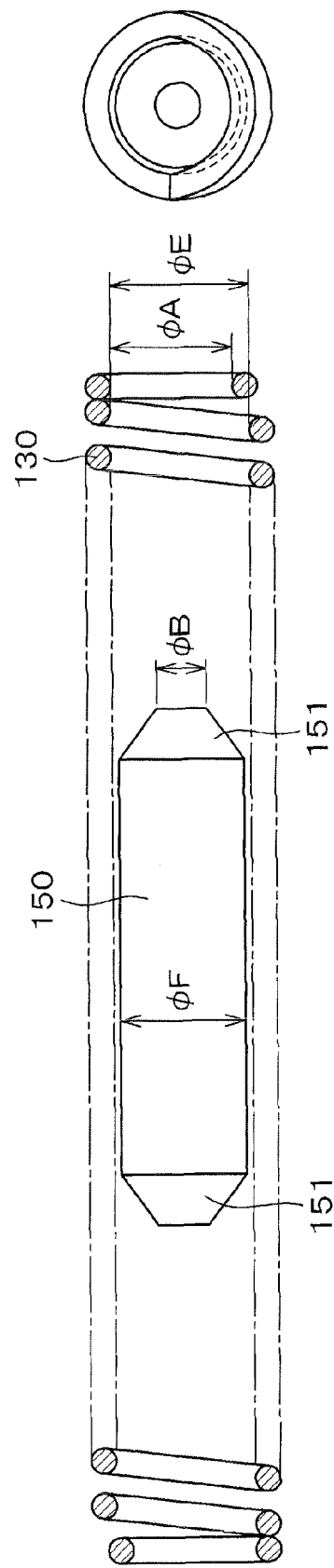
FIG. 2(a) is a schematic side elevational view showing the relationship between the plunger-biasing spring and the bar in the hydraulic tensioner of FIG. 1.
FIG. 2(b) is a schematic end elevational view of the spring and bar of FIG. 2(a)

When the end portions of the bar 150 and the plunger-biasing spring 130 are symmetrical as shown in FIGS. 1 and 2, the assembly consisting of the spring and the bar incorporated within it, can be inserted into the plunger-accommodating hole of the tensioner housing in either direction. Thus, efficient and error-free assembly can be ensured.

We claim:

1. A hydraulic tensioner comprising:
   a housing having a plunger-accommodating hole formed therein and extending along an axis, said hole having an opening and a bottom spaced from the opening;
   a plunger slidably protruding from the plunger-accommodating hole, through said opening, in a protruding direction, and, with said hole, defining a high pressure oil chamber, said plunger being movable from a fully retracted position to a fully extended position;
   a coil spring disposed within the high pressure oil chamber, said spring being wound around said axis, being in compression, and biasing the plunger in said protruding direction;
   a check valve incorporated into the housing for allowing oil to flow into the high pressure oil chamber and blocking flow of oil out of the high pressure oil chamber; and
   a bar at least a part of which is located within said coil spring, the bar reducing the volume of the high pressure oil chamber;
   in which the coil spring has first and second opposite ends, and comprises a coil-shaped intermediate part of disposed between said ends,
   in which a clearance is provided between said coil-shaped intermediate part of the spring and the bar, said clearance allowing relative axial movement of the spring and the bar; and
   in which a part of the coil spring adjacent said first end of said first and second opposite ends is positioned to block passage of said bar out of the coil spring, whereby the bar is prevented from dropping out of the coil spring during assembly of the tensioner.

2. A hydraulic tensioner according to claim 1, in which a part of the coil spring adjacent said second end of said first and second opposite ends is also positioned to block passage of said bar out of the coil spring.

3. A hydraulic tensioner according to claim 2, in which said parts of the coil spring adjacent said first and second opposite ends are both bent inwardly.

4. A hydraulic tensioner according to claim 3, in which the check valve is positioned at the bottom of the plunger-accommodating hole, in which said first end of the coil spring is located adjacent the bottom of the plunger-accommodating hole, in which said part of the first end of the coil spring adjacent said first end has an opening centered on said axis, in which the bar has a cylindrical intermediate portion larger than said opening, and a tapered end portion facing said check valve, and in which a part of the tapered end portion is smaller than said opening, whereby said tapered end portion is able to extend axially past said part of the coil spring adjacent said first end and to contact the check valve at an area of contact, and said check valve has an oil passage offset from said area of contact whereby oil can flow through said check valve into the high pressure oil chamber when said tapered end portion is in contact with said check valve.

5. A hydraulic tensioner according to claim 4, in which, when the plunger is in its fully retracted position, the axial length of the coil spring is greater than the axial length of the bar.

6. A hydraulic tensioner according to claim 3, in which, when the plunger is in its fully retracted position, the axial length of the coil spring is greater than the axial length of the bar.

7. A hydraulic tensioner according to claim 2, in which the check valve is positioned at the bottom of the plunger-accommodating hole, in which said first end of the coil spring is located adjacent the bottom of the plunger-accommodating hole, in which said part of the first end of the coil spring adjacent said first end has an opening centered on said axis, in which the bar has a cylindrical intermediate portion larger than said opening, and a tapered end portion facing said check valve, and in which a part of the tapered end portion is smaller than said opening, whereby said tapered end portion is able to extend axially past said part of the coil spring adjacent said first end and to contact the check valve at an area of contact, and said check valve has an oil passage offset from said area of contact whereby oil can flow through said check valve into the high pressure oil chamber when said tapered end portion is in contact with said check valve.

8. A hydraulic tensioner according to claim 7, in which, when the plunger is in its fully retracted position, the axial length of the coil spring is greater than the axial length of the bar.

9. A hydraulic tensioner according to claim 2, in which, when the plunger is in its fully retracted position, the axial length of the coil spring is greater than the axial length of the bar.

10. A hydraulic tensioner according to claim 1, in which said part of the coil spring adjacent said first end is bent inwardly.

11. A hydraulic tensioner according to claim 10, in which the check valve is positioned at the bottom of the plunger-accommodating hole, in which said first end of the coil spring is located adjacent the bottom of the plunger-accommodating hole, in which said part of the first end of the coil spring adjacent said first end has an opening centered on said axis, in which the bar has a cylindrical intermediate portion larger than said opening, and a tapered end portion facing said check valve, and in which a part of the tapered end portion is smaller than said opening, whereby said tapered end portion is able to extend axially past said part of the coil spring adjacent said first end and to contact the check valve at an area of contact, and said check valve has an oil passage offset from said area of contact whereby oil can flow through said check valve into the high pressure oil chamber when said tapered end portion is in contact with said check valve.

12. A hydraulic tensioner according to claim 11, in which, when the plunger is in its fully retracted position, the axial length of the coil spring is greater than the axial length of the bar.

13. A hydraulic tensioner according to claim 10, in which, when the plunger is in its fully retracted position, the axial length of the coil spring is greater than the axial length of the bar.

14. A hydraulic tensioner according to claim 1, in which the check valve is positioned at the bottom of the plunger-accommodating hole, in which said first end of the coil spring is located adjacent the bottom of the plunger-accommodating hole, in which said part of the first end of the coil spring adjacent said first end has an opening centered on said axis, in which the bar has a cylindrical intermediate portion larger than said opening, and a tapered end portion facing said check valve, and in which a part of the tapered end portion is smaller than said opening, whereby said tapered end portion is able to extend axially past said part of the coil spring adjacent said first end and to contact the check valve at an area of contact, and said check valve has an oil passage offset from said area of contact whereby oil can flow through said check valve into the high pressure oil chamber when said tapered end portion is in contact with said check valve.

15. A hydraulic tensioner according to claim 14, in which, when the plunger is in its fully retracted position, the axial length of the coil spring is greater than the axial length of the bar.

16. A hydraulic tensioner according to claim 1, in which, when the plunger is in its fully retracted position, the axial length of the coil spring is greater than the axial length of the bar.

* * * * *